(12) United States Patent
Sarkar et al.

(10) Patent No.: US 7,990,921 B1
(45) Date of Patent: Aug. 2, 2011

(54) INTELLIGENT TRAFFIC-CHANNEL-ASSIGNMENT MESSAGE TRANSMISSION

(75) Inventors: Debasish Sarkar, Irvine, CA (US); Sachin R. Vargantwar, Overland Park, KS (US); Siddharth S. Oroskar, Overland Park, KS (US); Manoj Shetty, Overland Park, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 203 days.

(21) Appl. No.: 12/209,384

(22) Filed: Sep. 12, 2008

(51) Int. Cl.
*H04W 4/00* (2009.01)

(52) U.S. Cl. ........................................ 370/329; 370/437

(58) Field of Classification Search ........................ None
See application file for complete search history.

(56) References Cited

U.S. PATENT DOCUMENTS

| | | | |
|---|---|---|---|
| 7,106,718 B2 * | 9/2006 | Oyama et al. ................. | 370/340 |
| 7,636,580 B1 * | 12/2009 | Barrow et al. ................. | 455/518 |
| 2003/0050070 A1 * | 3/2003 | Mashinsky et al. ............ | 455/452 |
| 2005/0288041 A1 * | 12/2005 | Gill et al. ...................... | 455/458 |
| 2007/0238442 A1 * | 10/2007 | Mate et al. .................... | 455/403 |
| 2008/0019373 A1 * | 1/2008 | Filipovich et al. ......... | 370/395.4 |

OTHER PUBLICATIONS

3GPP2 C.S0024, cdma2000 High Rate Packet Data Air Interface Specification, Oct. 27, 2000, Version 2.0, pp. cover, "2-3", "6-26", "6-27", "6-57"-"6-60".*

* cited by examiner

*Primary Examiner* — Kwang B Yao
*Assistant Examiner* — Alex Skripnikov

(57) ABSTRACT

Disclosed herein is a method for selecting one or more capsules in which to include a traffic channel assignment message. The method may be carried out in a wireless communication network that provides wireless service in a coverage area, wherein the coverage area comprises a plurality of sectors, wherein a control channel is provided in each sector, and wherein the wireless communication network is configured to transmit synchronous capsules and asynchronous capsules in each control channel. The method may comprise: (a) receiving a request from an access terminal to engage in a communication session; (b) making a determination of whether or not the requested communication session is of a type that is designated for priority service; (c) using the determination of whether or not the requested communication session is of a type that is designated for priority service as a basis for selecting one or more capsules in which to include the traffic channel assignment message; and (d) transmitting each of the selected capsules, wherein each of the selected capsules comprises the traffic channel assignment message.

20 Claims, 7 Drawing Sheets

| TCA_Transmit_Mode | Route Update Message Identifies Single Sector | Route Update Message Identifies Multiple Sectors | |
|---|---|---|---|
| | Sector of Access | Sector of Access | Other Sectors |
| 0 (default) | asynchronous | synchronous | synchronous |
| 1 | asynchronous | asynchronous | synchronous |
| 2 | asynchronous and synchronous | asynchronous and synchronous | synchronous |

FIGURE 2

| Application | Control Channel Occupancy | Route Update Message contains a single sector | Route Update Message contains multiple sectors | |
|---|---|---|---|---|
| | | Sector of Access | Sector of Access | Other Sectors |
| Q-CHAT | -- | Asynchronous and Synchronous Capsule | Asynchronous and Synchronous Capsule | Asynchronous and Synchronous Capsule |
| BE | >T1 | Synchronous capsule | Synchronous capsule | Synchronous capsule |
| | T1> CC>T2 | Asynchronous Capsule | Synchronous capsule | Synchronous capsule |
| | T2> CC>T3 | Asynchronous and Synchronous Capsule | Asynchronous and Synchronous Capsule | Synchronous capsule |
| | T3>CC | Asynchronous and Synchronous Capsule | Asynchronous and Synchronous Capsule | Asynchronous and Synchronous Capsule |

FIGURE 6

INTELLIGENT TRAFFIC-CHANNEL-ASSIGNMENT MESSAGE TRANSMISSION

BACKGROUND

In a wireless access network (also referred to interchangeably as an "access network"), radio network controllers use traffic channel assignment (TCA) messages to notify access terminals of the traffic channel that has been assigned to each access terminal for a particular communication session. Thus, when an access terminal attempts to establish a connection to an access network, the access network may select a traffic channel to be used for the session and send the access terminal a TCA message that identifies the selected traffic channel. In access networks operating under the EV-DO air interface protocol, the access network transmits each TCA message, which includes a Walsh Code and/or a Medium Access Control (MAC) ID that corresponds to the assigned traffic channel, over the control channel.

Under EV-DO, a TCA message, like other control channel information, may be included in the transmission of an asynchronous capsule and/or a synchronous capsule of the control channel. A synchronous capsule is periodically transmitted in the control channel, with a predetermined interval between the transmissions. The asynchronous capsule, on the other hand, is not generally sent according to a defined schedule, and can be sent as needed. Thus, a TCA message may be delivered to the access terminal more quickly by sending the TCA message in the asynchronous capsule. Further, repeating the transmission of the TCA message and/or sending the TCA message in multiple sectors of the access network (i.e. sending the message from multiple base stations or radio network controllers), may increase the likelihood that an access terminal will successfully receive a TCA message.

OVERVIEW

Sending a TCA message in the asynchronous capsule of the control channel, or both the synchronous and asynchronous capsules of the control channel, may reduce latency in providing a requested communication session to the access terminal. To illustrate, setup or handoff of a communication session may be delayed while an access terminal waits to receive a TCA message with the Walsh code for the sector that the access terminal is connecting or handing off to. Sending a TCA message more frequently and/or from more sources may reduce the time an access terminal spends waiting to receive the TCA message, and thus reduce the latency experienced by the access terminal. However, each transmission of a TCA message increases control channel occupancy, and under EV-DO, the control channel is time-division multiplexed with the traffic channel. Thus, when sending a TCA message, the access network uses network resources that otherwise might be allocated to the traffic channel. Therefore, sending a TCA message more frequently may reduce data throughput and/or quality of service in a given coverage area.

When a communication session is of a type that is not sensitive to network delays and/or outages, increased latency resulting from a delayed TCA message may have little to no detrimental effect. On the other hand, for certain types of communication sessions, latency resulting from a delayed TCA message may reduce the quality of service or even cause the session to fail altogether. Accordingly, when a user initiates a communication session, an exemplary method and system take into account whether the application is of a type that requires or benefits from expedient delivery of a TCA message (i.e. whether the session should receive priority service). Moreover, to help efficiently deliver TCA messages, the exemplary method and system may consider additional factors, such as the control channel occupancy and the number of sectors included in a route update message from the access terminal, among others, to intelligently determine how to transmit the TCA message.

In one aspect, a method for selecting one or more capsules in which to include a traffic channel assignment message is disclosed. The method may be carried out in a wireless communication network that provides wireless service in a coverage area, wherein the coverage area comprises a plurality of sectors, wherein a control channel is provided in each sector, and wherein the wireless communication network is configured to transmit synchronous capsules and asynchronous capsules in each control channel. The method comprises (a) receiving a request from an access terminal to engage in a communication session; (b) making a determination of whether or not the requested communication session is of a type that is designated for priority service; (c) using the determination of whether or not the requested communication session s of a type that is designated for priority service as a basis for selecting one or more capsules in which to include the traffic channel assignment message; and (d) transmitting each of the selected capsules, wherein each of the selected capsules comprises the traffic channel assignment message.

The step of selecting one or more capsules in which to include the traffic channel assignment message may involve: (a) if the determination is that requested communication session is of a type that is designated for priority service, then using a first subroutine to select the one or more capsules in which to include the traffic channel assignment message; or (b) if the determination is not of a type that is designated for priority service, then using a second subroutine to select the one or more capsules in which to include the traffic channel assignment message.

In an exemplary embodiment, the first subroutine may involve, if the determination is that requested communication session is of a type that is designated for priority service, then selecting the synchronous and asynchronous capsules in each sector included in a route update message that was received from the access terminal.

In an exemplary embodiment, the second subroutine may involve: (i) if a determined control channel occupancy level is greater than or equal to a first threshold, selecting the synchronous capsule of each sector identified in the route update message; (ii) if the determined control channel occupancy level is less than the first threshold and greater than or equal to a second threshold, then (a) if the route update message identifies exactly one sector, selecting the asynchronous capsule of the sector of access and (b) if the route update message identifies more than one sector, selecting the asynchronous capsule of the sector of access and the synchronous capsule of any other sectors identified by the route update message; (iii) if the determined control channel occupancy level is less than the second threshold and greater than or equal to a third threshold, then (a) if the route update message identifies exactly one sector, selecting the synchronous and asynchronous capsules of the sector of access and (b) if the route update message identifies more than one sector, selecting the synchronous and asynchronous capsules of the sector of access and the synchronous capsule of any other sectors identified by the route update message; and (iv) if the determined control channel occupancy level is less than the third threshold selecting the synchronous and asynchronous capsules of each sector identified in the route update message.

In another aspect, a method for selecting one or more capsules in which to include a traffic channel assignment message is disclosed. The method comprises (i) receiving a request from an access terminal to engage in a communication session; (ii) determining a control channel occupancy level for at least a portion of the coverage area; (iii) using the determined control channel occupancy level as a basis for selecting one or more capsules in which to include the traffic channel assignment message; and (iv) transmitting each of the selected capsules, wherein each of the selected capsules comprises the traffic channel assignment message.

In another aspect, a system configured to select one or more capsules in which to include a traffic channel assignment message and configured to be implemented in a wireless communication network that provides wireless service in a coverage area, wherein the coverage area comprises a plurality of sectors, wherein a control channel is provided in each sector, and wherein the wireless communication network is configured to transmit synchronous capsules and asynchronous capsules in each control channel, is disclosed. The system comprises (i) a receiver configured to receive a request from an access terminal to engage in a communication session; and (ii) a controller configured to (a) make a determination as to whether or not the requested communication session is of a type that is designated for priority service; (b) use the determination of whether or not the requested communication session is of a type that is designated for priority service as a basis for to select one or more capsules in which to include the traffic channel assignment message; and (c) provide the traffic channel assignment message for inclusion in the selected capsules; and (iii) a transmitter configured to transmit the selected capsules, wherein each transmitted selected capsule includes the traffic channel assignment message.

The system may also include a database identifying one or more types of communication sessions that are designated for priority service. As such, the controller may be further configured to query the database to determine whether or not the requested communication session is designated for priority service.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 2 is a table illustrating modes for sending TCA messages;

FIG. 6 is a table indicating the capsules to be selected for sending a TCA message, according to an exemplary embodiment.

DETAILED DESCRIPTION

I. Wireless Network Architecture

In a RAN, such as RAN 100, a wireless carrier can implement numerous base transceiver station (BTS) towers, such as BTSs 112-118, which helps to provide contiguous coverage for wireless subscribers. Each BTS 112-118 can be configured to define a respective cell site, as well as number of cell sectors, such as sectors 104-110. Groups of BTS towers in a given region will then typically be connected with a radio network controller (RNC) (also known as a base station controller (BSC)). In RAN 100, BTSs 112-116 are connected to RNC 120, and BTS 110 is connected to RNC 122. An RNC may then connect with a switch, such as mobile switching center (MSC) 121, which provides connectivity with a transport network such as the public switched telephone network (PSTN) 128, or with a gateway, such as a packet-data serving node (PDSN) 124, which provides connectivity with a packet-switched network 126 such as the Internet.

With this arrangement, when an access terminal 102 (such as a cellular telephone or wirelessly-equipped portable computer or personal digital assistant, for instance) is positioned in a sector, the access terminal 102 may communicate via an RF air interface with a serving BTS. For instance, when access terminal 102 is located in sector 106, the access terminal may connect to BTS 114. Consequently, a communication path can be established between the access terminal 102 and PSTN 128 or packet-switched network 126 via an RF air interface, BTS 114, RNC 120 and MSC 121 or gateway PDSN 124, respectively.

Communications between access terminal 102 and BTS 114 generally proceed according to one or more air interface protocols, such as Code Division Multiple Access (CDMA), Time Division Multiple Access (TDMA), Global System for Mobile Communications (GSM), 1xRTT, 1xEV-DO, iDEN, AMPS, GPRS, UMTS, EDGE, WiMAX (e.g., IEEE 802.16), LTE, microwave, satellite, MMDS, Wi-Fi (e.g., IEEE 802.11), and/or Bluetooth, among others. Air interface communications from the base station to the access terminal may be referred to as "forward link" or "downlink" communications, while those from the access terminal to the base station may be referred to as "reverse link" or "uplink" communications.

Figure 1A:
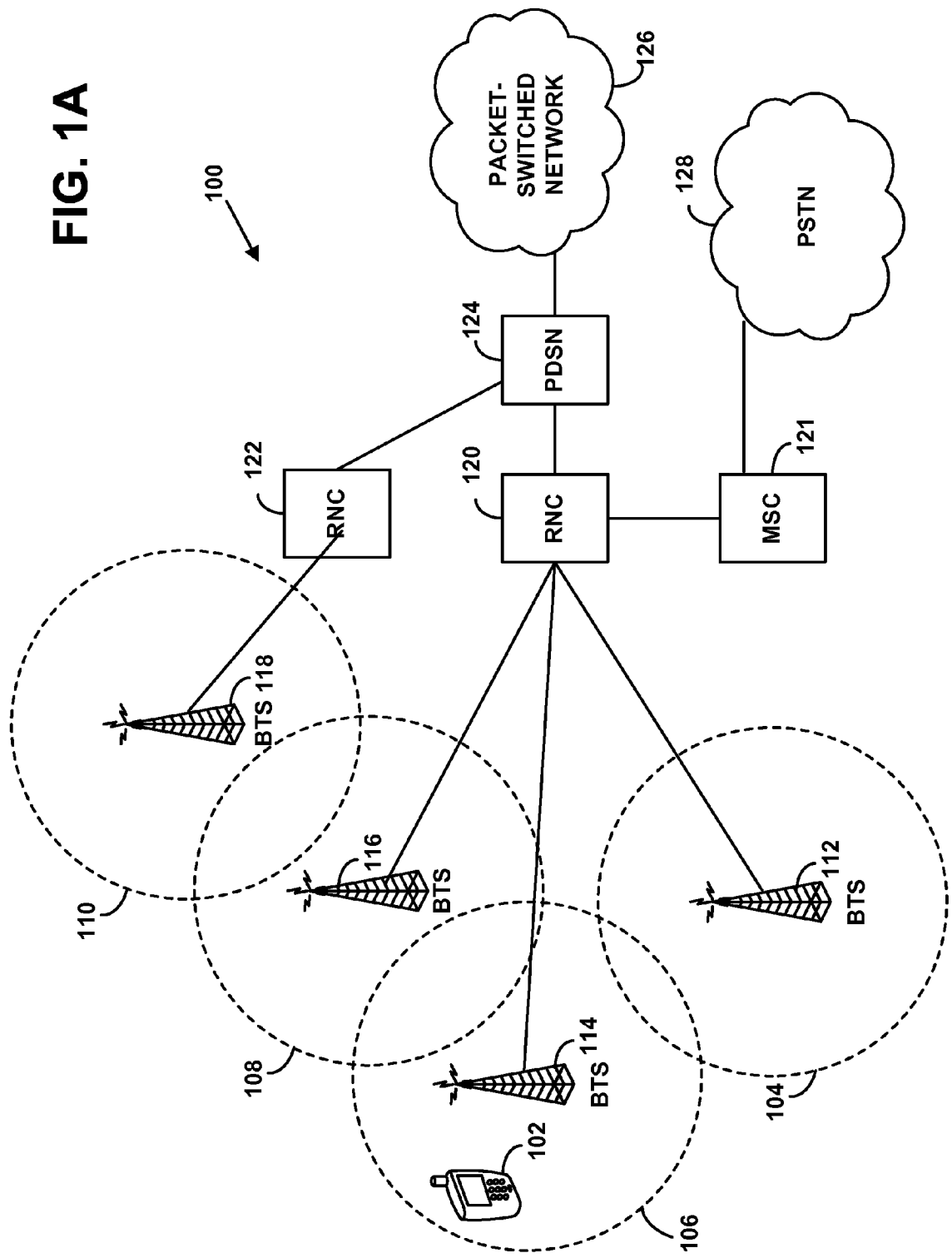
FIG. 1A depicts a wireless access network, according to an exemplary embodiment.

To provide the arrangement of FIG. 1 in practice, each access terminal is commonly equipped with a "mobile station modem" chipset such as one of the various "MSM" chipsets available from Qualcomm Incorporated, and each base station is commonly equipped with a "cell site modem" chipset such as one of the various "CSM" chipsets available from Qualcomm Incorporated. Preferably, the air-interface protocols under which service is provided by base station 108 include EV-DO. By way of example, each cell site modem can be a Qualcomm CSM6800™ chipset, and each mobile station modem can be an MSM6800™ chipset. Both the CSM6800™ chipset and MSM6800™ chipset have EV-DO operating modes (e.g., 1xEV-DO Rev. 0 or Rev. A), and each chipset can be programmatically set to operate in that mode. It should be understood that other chipsets, including upgrades to the chipsets named herein, as well as others providing similar functionality, may also be utilized without departing from the scope of the invention.

II. EV-DO Communications

Under EV-DO, the forward link uses time-division multiplexing (TDM) in order to allocate all of the sector's forward-link power to a given access terminal at any given moment, while the reverse link retains the code-division multiplexing (CDM) format of 1xRTT, albeit with the addition of a "data rate control" (DRC) channel used to indicate the supportable data rate and best serving sector for the forward link. The EV-DO forward link is divided into time slots of length 2048 chips, and each time slot is further time-division multiplexed to carry various channels, including a pilot channel, a Medium Access Control (MAC) channel, a "control" channel, and, if any traffic exists, a forward traffic channel.

The pilot channel may be used for signal acquisition, synchronization, demodulation, and decoding, as well as Signal-to-Noise Ratio (SNR) estimation. In particular, a base station transmits a pilot signal over the pilot channel. The pilot signal is encoded with a particular PN offset that identifies the sector. An access terminal that is within range of the base station can then detect the pilot signal, use the relative strength of the pilot signal to estimate the SNR in the sector, synchronize with the base station, etc.

The MAC channel includes information for those access terminals that are active in a sector (i.e., that have established connectivity to the base station serving the sector). In particular, the MAC channel provides data rate control (DRC) mechanisms to control the data rate that an access terminal should use on the forward link. The forward-link data rate is generally determined based on the SNR for the access terminal.

The traffic channel is used for transmission of user data (e.g., the data making up an incoming communication, incoming file, etc.) from a base station to an access terminal. In EV-DO, the traffic channel is time-division multiplexed with the control channel and is used by only one access terminal in each time slot. To accommodate this configuration, a scheduler is used to assign a particular access terminal for each time slot. As such, each packet sent on the traffic channel includes a preamble, which in turn includes a MAC Index indicating the access terminal for which the packet is intended. The scheduler may be integrated into an RNC or exist as a separate entity that monitors and schedules user data being sent from one or multiple RNCs.

Since the control channel is time-division multiplexed with the traffic channel, the base station specifies to an access terminal when user data is being transmitted (i.e. when the traffic channel is in use), and when control channel information is being transmitted (i.e. when the control channel is in use). To do so, the base station may use certain MAC index values. For instance, in EV-DO, a MAC index equal to "2" identifies user data (implying that the traffic channel is in use), while a MAC index equal to "3" identifies control channel information (implying that the control channel is in use). These MAC index values are reserved for this channel coordination information, and therefore are not assigned to identify any particular access terminal.

Control channel information may be sent over the control channel in a control channel "capsule," which is a packet or set of packets that may be sent from time-to-time over the control channel. In EV-DO, control channel information may be sent in a "synchronous capsule" or an "asynchronous capsule." In EV-DO, a synchronous capsule is sent periodically at intervals that are multiples of 256 time slots, while an asynchronous capsule may be sent as needed, in any time slot in which a synchronous capsule is not being transmitted.

During setup of an EV-DO communication session, the synchronous or asynchronous capsule may be used to send a traffic channel assignment (TCA) message. A TCA message assigns a traffic channel to an access terminal for a given communication session, so that the scheduler will see the access terminal as active and include the access terminal when allocating time slots. More specifically, when an access terminal is establishing a session via a particular base station, the base station may send a TCA message, assigning particular air interface traffic channel, which is identified by a particular Walsh Code, to the access terminal. In response to the TCA message, the access terminal tunes to the assigned traffic channel and receives blank frames transmitted by the base station. The access terminal then confirms receipt of the blank frames by sending a preamble of blank frames to the base station, which in turn acknowledges receipt of the blank frames by sending an Acknowledgement Order message to the access terminal. The access terminal then acknowledges with an Acknowledgement Order message to the base station over the traffic channel.

Recent chipsets, such as those incorporating Motorola's feature release 9344, may provide additional modes for sending TCA messages, as shown in FIG. 2. As illustrated by FIG. 2, in the default mode (TCA_Transmit_Mode=0), a TCA message is sent in the asynchronous capsule when the route update message includes only one sector, and in the synchronous capsule of each reported sector, when the route update message includes multiple sectors. In a first alternative mode (TCA_Transmit_Mode=1), the TCA message is sent in the asynchronous capsule at the sector of access when the access terminal reports a single sector in the route update message. Alternatively, when the access terminal reports multiple sectors, the TCA message is sent in the asynchronous capsule at the sector of access and in the synchronous capsule in all other reported sectors. In a second alternative mode (TCA_Transmit_Mode=2), the TCA message is sent in the asynchronous and synchronous capsules at the sector of access, and in synchronous capsule in all other reported sectors (if more than one sector is reported in the route update message).

In another aspect of EV-DO, an access terminal may from time to time send a route update message to the access network (e.g., to the base station and/or RNC). To generate a route update message, the access terminal measures pilot strength signal from one or more available base stations, and inserts the available data rates into the route update message. When an access terminal is in idle mode (i.e. not engaged in a communication session), a route update message may be sent in various scenarios. For example, route update messages may be prompted by a route update request from the access network. As additional examples, a route update message may be sent when the access terminal has moved more than a predetermined distance since the last Route Update Message, or when the access terminal sends a registration message on the access channel (such as a Unicast Access Terminal Identifier (UATI) request or a connection request, for instance). A route update message can also be sent by an access terminal during a communication session. For example, the access terminal may send a route update message whenever the strength of a pilot signal changes a predetermined level, or in response to a request from the RNC. It should be understood that in 1xRTT, Pilot Strength Measurement Messages (PSMMs) may be used in a similar manner as route update messages in EV-DO. Further, when other protocols are used, similar functionality may be provided by other types of messages.

III. System Configured to Select Capsules for a TCA Message

Figure 1B:
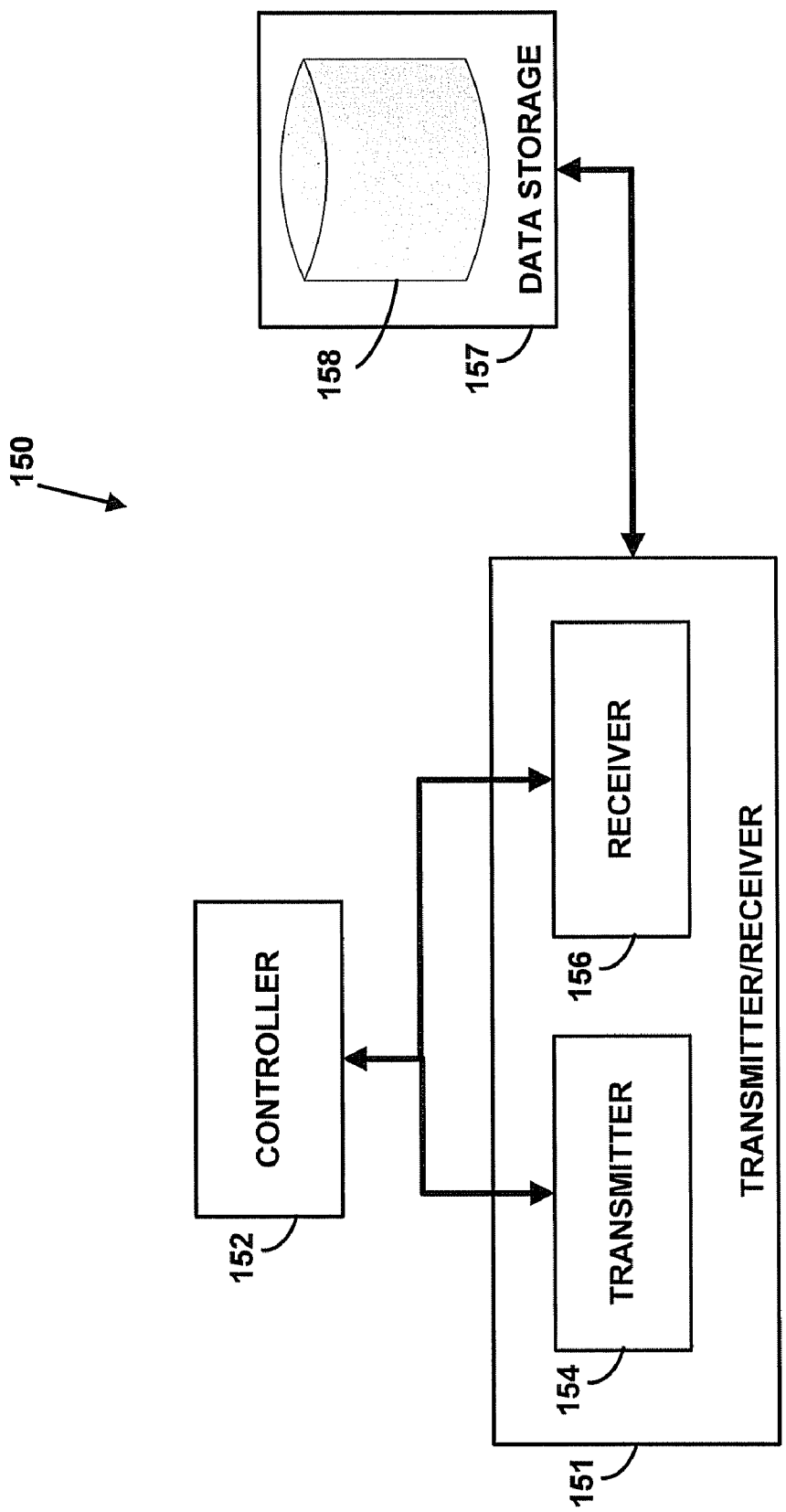
FIG. 1B is a block diagram illustrating an exemplary system that is configured to select one or more capsules in which to include a traffic channel assignment message.

FIG. 1B is a block diagram illustrating an exemplary system 150 that is configured to select one or more capsules in which to include a traffic channel assignment message. The system may be implemented in a wireless communications network. Accordingly, one skilled in the art will understand that an exemplary system may be implemented in various entities or combinations of entities in a wireless access network. For instance, the system may be integrated into an RNC, a session controller, a BTS, or various combinations of these and other network entities. Alternatively, the system may be implemented as a new entity that is communicatively coupled to other network entity or entities. Other implementations are also possible.

The system includes a transmitter/receiver or transceiver 151 and a controller 152. The transceiver 151 includes a transmitter portion 154 and receiver portion 156. It should be understood that transceiver 151 may be replaced with a separate transmitter and receiver, without departing from the scope of the invention. Receiver 156 is configured to receive a request from an access terminal to engage in a communication session. Controller 152 is configured to (a) make a determination as to whether or not the requested communication session is of a type designated for priority service; (b) use the determination of whether or not the requested communication session is of a type designated for priority service as a basis for to select one or more capsules in which to include the traffic channel assignment message; and (c) provide the traffic channel assignment message for inclusion in the selected capsules. Further, transmitter 154 is configured to transmit the selected capsules, wherein each transmitted selected capsule includes the traffic channel assignment message.

Further, the system may include or have access to data storage 157, which includes a database 158. Database 158 may provide data that indicates whether or not various types of communication sessions are designated for priority service. Accordingly, the controller 152 may be configured to access or query the database 158 to determine whether or not a requested communication session is of a type that is designated for priority service. Further, controller 152 may be configured to populate or edit database 158, so that the database accurately reflects the types of communication sessions that are designated for priority service.

III. Method for Selecting Capsules in which to Include a TCA Message

In an exemplary method, when a requested communication session is of a type that is designated for priority service, the wireless communication network may include the TCA message in both the synchronous and asynchronous control channel in the sector of access, as well as any other sectors identified in the most recent route update message received from the requesting access terminal. For a communication session of a type that is designated for priority service, the network may use a number of factors, including the control channel occupancy, among others, to determine which capsules should include the TCA message. In practice, communication sessions of a type that are sensitive to latency may be designated for priority service so that a traffic channel can be more rapidly assigned, thus reducing the latency experienced by the access terminal during session setup or session handoff.

Exemplary methods may be described herein as being carried out by a wireless communications network (or simply a "network"). However, one skilled in the art will understand that exemplary methods may be carried out by a number of entities or combinations of entities in a wireless access network. For instance, the method may be carried out by an RNC, a session controller, a BTS, or various combinations of these and other network entities.

Figure 3:
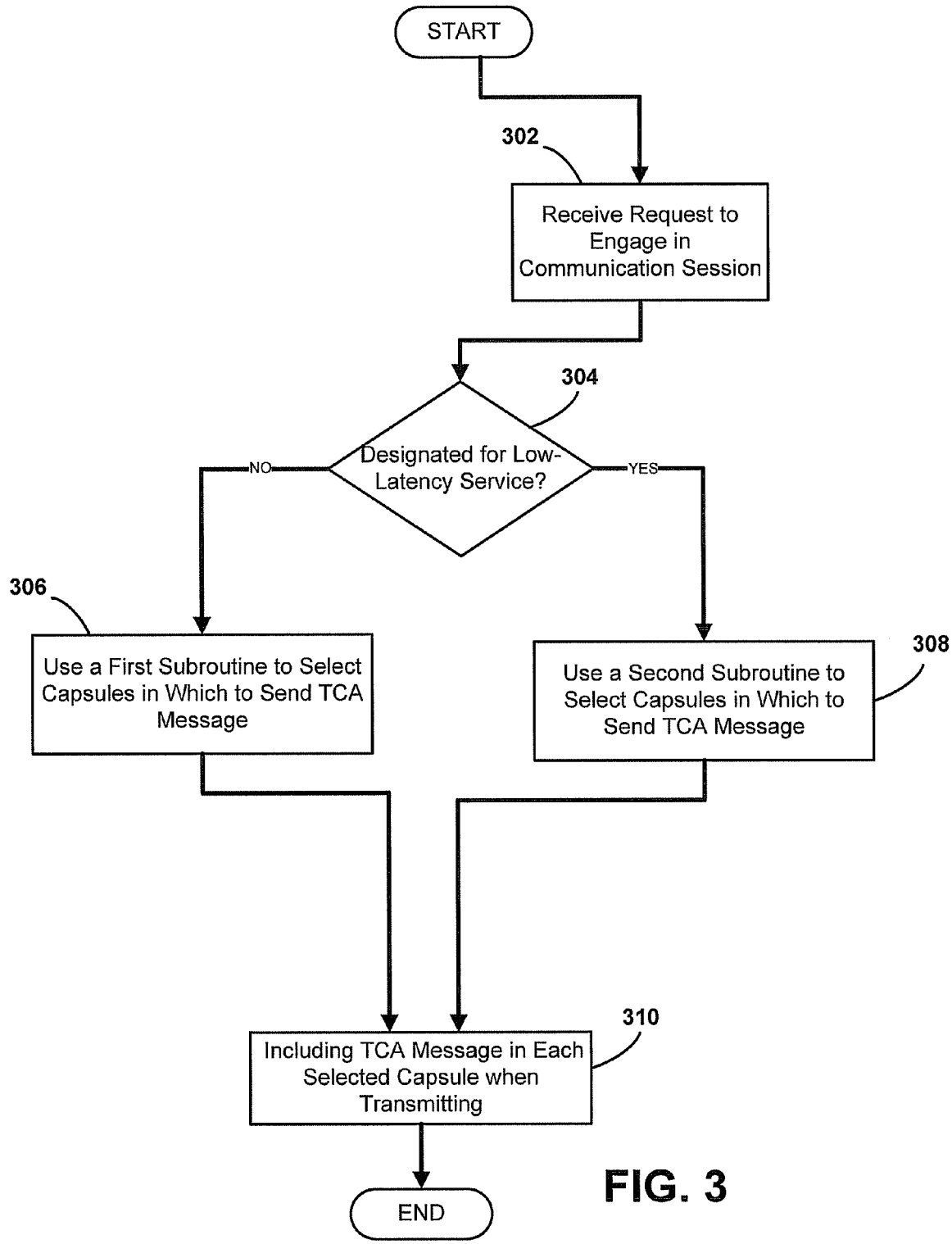
FIG. 3 is a flow chart illustrating a method for selecting one or more control channel capsules in which to send a traffic channel assignment message to an access terminal, according to an exemplary embodiment.

FIG. 3 is a flow chart illustrating a method for selecting one or more capsules in which to include a TCA message, according to an exemplary embodiment. The method may be implemented in a wireless communication network that includes a plurality of sectors in which wireless service is provided. The method involves a network receiving a request from an access terminal to engage in a communication session, as shown in block 302. The network then determines whether or not the requested communication session is of a type designated for priority service, as shown in block 304.

The network then uses the determination as to whether the requested communication session is of a type designated for priority service as a basis to select the one or more control channel capsules in which to send the TCA message. More specifically, if the communication session is of a type designated for priority service, the network uses a first subroutine to select the capsules in which to send the TCA message, as shown by block 306. In an exemplary embodiment, the first subroutine involves the network selecting the asynchronous capsule and the synchronous capsule of each sector identified in the route update message. On the other hand, if the communication session is not of a type designated for priority service, the network uses a second subroutine to select the capsules in which to send the TCA message, as shown by block 308. The second subroutine may involve consideration of various factors, such as the control channel occupancy and/or the number of sectors in a recently received route update message from the access terminal, to select the capsules in which to send the traffic channel assignment message. The network then includes the TCA message in each selected capsule and transmits each selected capsule, as shown by block 310.

The method may further involve designating one or more types of communication sessions for priority service. For example, QChat and other types of push-to-talk (PTT) communications, and/or any other communications that are latency-sensitive, may be designated for priority service. More generally, any type of communication session requiring or benefiting from efficient session setup and/or handoff, may be designated for priority service. Other examples of designated types of communication are also possible.

Figure 4:
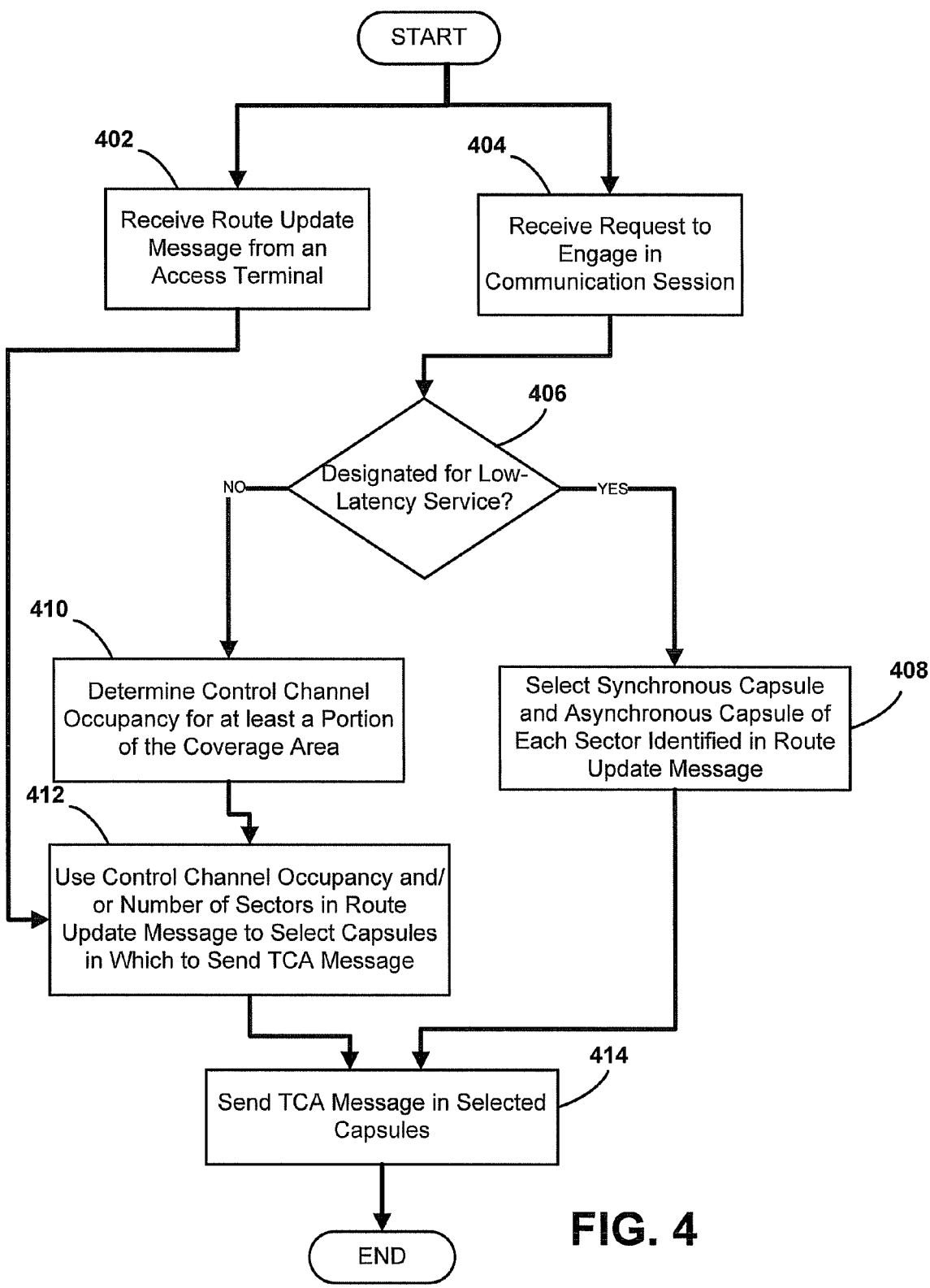
FIG. 4 is another flow chart illustrating a method for selecting one or more control channel capsules in which to send a traffic channel assignment message to an access terminal, according to an exemplary embodiment.

FIG. 4 is another flow chart illustrating a method for selecting one or more control channel capsules in which to include a traffic channel assignment message, according to an exemplary embodiment. The method involves the network receiving a route update message from an access terminal, as shown by block 402. The route update message may identify one or more sectors for which the access terminal has detected a pilot signal having a signal strength above a predetermined threshold. The method also involves the network receiving a request to engage in a communication session from the access terminal, as shown in block 404. The network may then determine whether or not the requested communication session is of a type that is designated for priority service, as shown in block 406.

The network then uses the determination as to whether the requested communication session is of a type that is designated for priority service (possibly in conjunction with other factors and/or inputs) to select one or more control channel capsules in which to include the TCA message. More specifically, if a communication session is of a type that is designated for priority service, the network selects the synchronous capsule and the asynchronous capsule of each sector identified in the route update message (which is preferably the most recent route update message received from the requesting access terminal), as shown by block 408.

If the communication session is not of a type that is designated for priority service, then the network implements a subroutine to determine how to send the TCA message to the access terminal. Specifically, the network may determine a control channel occupancy level for at least a portion of the coverage area in which the access terminal is located, as shown in block 410. The network then uses the determined control channel occupancy level and/or the number of sectors identified in the route update message to select the control channel capsules in which to include the traffic channel assignment message, as shown in block 412.

After selecting control channel capsules, the network transmits the selected capsules, including the TCA message in each of the selected capsules, as shown by block 414. One skilled in the art will understand that the selected capsules may be transmitted individually, but also may be transmitted concurrently. More specifically, the network may transmit the asynchronous capsule, including the TCA message, in each of the sectors identified in the route update message at approximately the same time. Additionally or alternatively, the network may stagger transmission of some or all of the selected capsules. For example, the network generally sends the synchronous and asynchronous capsules in a given sector at different times. As another example, the transmission of the asynchronous capsule in one sector may occur before the transmission of the asynchronous capsule in another sector. Many other examples are also possible.

One skilled in the art will also understand that the order in which the functions illustrated by blocks 402-412 are carried out may vary. For instance, the route update message may be received prior to, in conjunction with, or shortly after receiving the communication session request. As such, the determination of whether or not the communication session is of a type that is designated for priority service may occur before or after receiving the route update message. Other examples and variations are also possible.

Figure 5:
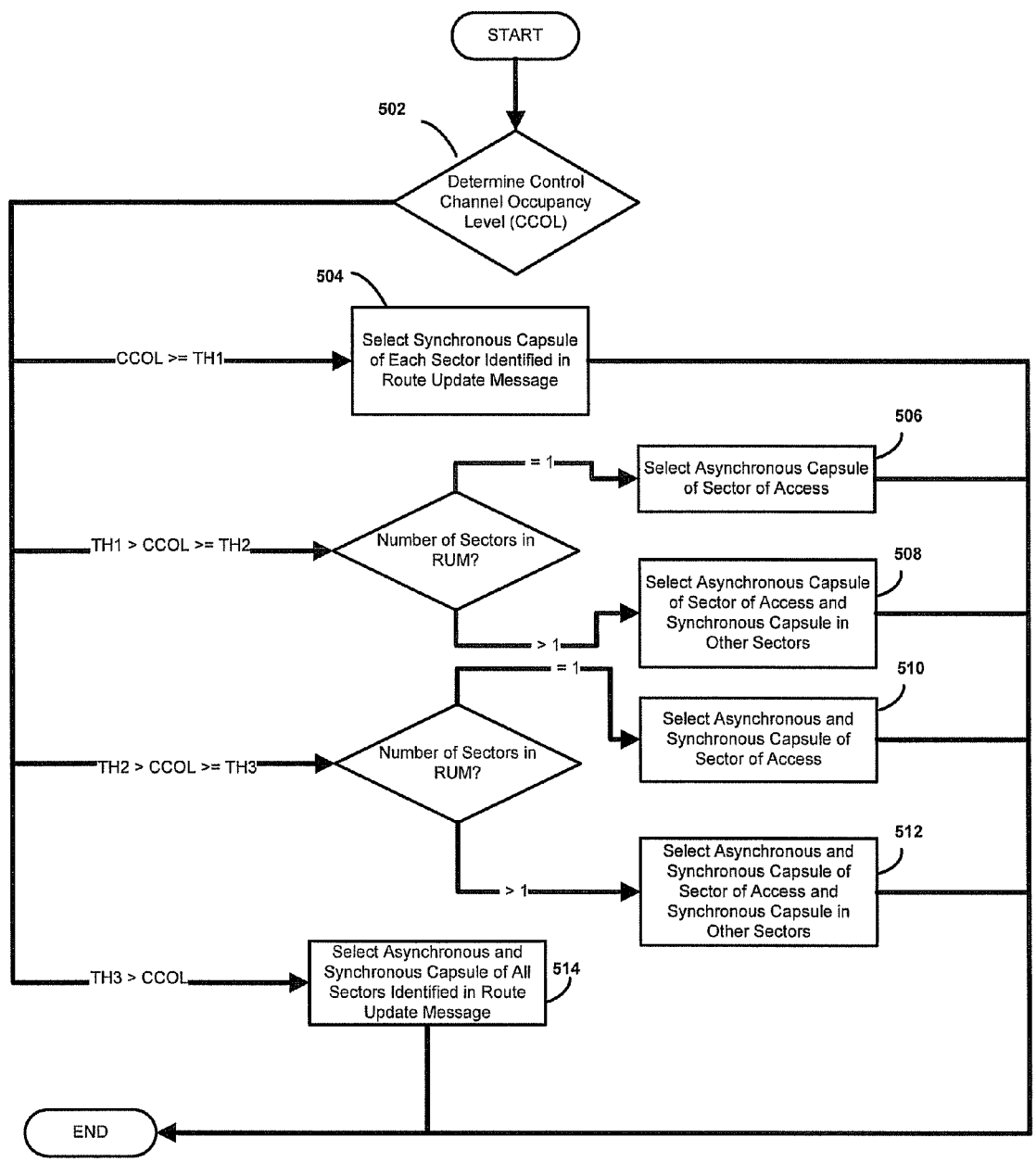
FIG. 5 shows an exemplary subroutine for selecting one or more capsules in which to send a traffic channel assignment message, according to an exemplary embodiment.

IV. Subroutine for Communication Sessions that are not Designated for Priority Service FIG. 5 shows an exemplary subroutine for selecting the one or more capsules in which to include the TCA message, once it has been determined that the requested communication session is not of a type that is designated for priority service. In this scenario, the network may determine and use the control channel occupancy level and/or the number of sectors reported by the requesting access terminal in the route update message, as a basis for selecting capsules in which to send the TCA message. More specifically, the network may determine a control channel occupancy level (CCOL) for at least a portion of its coverage area, as shown by block 502.

In the depicted subroutine, the determined control channel occupancy level is evaluated by comparing the determined occupancy level to a number of threshold occupancy levels: threshold TH1, threshold TH2, and threshold TH3, which are defined as:

full occupancy>TH1>TH2>TH3>no occupancy.

However, it should be understood that the continuum of possible control channel occupancy levels may be characterized by any number of threshold occupancy levels, without departing from the scope of the invention. According to this exemplary embodiment, if the determined occupancy level is greater than TH1, the network selects the synchronous capsule of each sector identified in the route update message, as shown by block 504. If the determined occupancy level is less than TH1 and greater than TH2, then (a) if the route update message identifies exactly one sector, the network selects the asynchronous capsule of the sector of access, as shown by block 506 or (b) if the route update message identifies more than one sector, the network selects the asynchronous capsule of the sector of access and the synchronous capsule of any other sectors identified in the route update message, as shown by block 508. If the determined occupancy level is less than TH2 and greater than a TH3, the network selects the asynchronous and synchronous capsule of the sector of access, and the synchronous capsule of any other sectors identified by the route update message (if multiple sectors are identified) as shown by blocks 510 and 512. If the determined occupancy level is less than TH3, then the network selects the synchronous and asynchronous capsules of all sector(s) identified in the route update message (regardless of whether one or multiple sectors are identified), as shown by block 514.

FIG. 6 is a table illustrating the selection of capsules for a TCA message according to the methods and subroutines such as those illustrated in FIGS. 3-5. The table shows how the selected capsules vary depending upon whether a communication session is or is not of a type designated for priority service, the control channel occupancy level, and whether one or more sectors was identified in the route of message from the requesting access terminal. More specifically, the chart indicates the capsules to be selected for QChat (or any other type of push-to-talk session) and for best-effort (BE) communications. Therefore, the TCA message assigning the traffic channel for a QChat session is sent in the asynchronous and synchronous capsule at the sector of access and any other sectors reported in the most recent route update message from the requesting access terminal. For a BE communication, the TCA message is sent according to the subroutine illustrated in FIG. 5.

Control channel occupancy may be measured in various ways. For example, control channel occupancy may be defined as the average of the number of timeslots in use divided by the total number of available timeslots over a predetermined period of time (e.g., 30 minutes). Other techniques for measuring control channel occupancy are also possible.

Further, the control channel occupancy level may be representative of the control channel occupancy for a coverage area served by a single RNC, by multiple RNCs, multiple RANs, a subsection of the coverage area served by an RNC or RNCs. For example, the control channel occupancy level may be determined in only the sector of access for the requesting access terminal. As another example, the control channel occupancy level may be determined across all sectors identified in the route update message (in the event the route update message identifies multiple sectors), or across a subset of sectors in a wireless communication network, such as the sector of access and sectors neighboring or adjacent to the sector of access. Thus, the control channel occupancy level may be an average or a mean of the sectors identified in the route update message, or may be a weighted average, placing greater weight on the occupancy of the sector of access. Other examples are also possible.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. In a wireless communication network that provides wireless service in a coverage area, wherein the coverage area comprises a plurality of sectors, wherein a control channel is provided in each sector, and wherein the wireless communication network is configured to transmit synchronous capsules and asynchronous capsules in each control channel, a method for selecting one or more capsules in which to include a traffic channel assignment message, the method comprising:

receiving a request from an access terminal to engage in a communication session;

making a determination of whether or not the requested communication session is of a type that is designated for priority service;

using the determination of whether or not the requested communication session is of a type that is designated for priority service as a basis for selecting one or more capsules in which to include the traffic channel assignment message, wherein the traffic channel assignment message assigns a traffic channel to the access terminal for the communication session, and wherein selecting the one or more capsules comprises selecting from between: (a) one or more synchronous capsules, (b) one or more asynchronous capsules, and (c) one or more synchronous capsules and one or more asynchronous capsules; and transmitting each of the selected capsules, wherein each of the selected capsules comprises the traffic channel assignment message.

2. The method of claim 1, wherein selecting one or more capsules in which to include the traffic channel assignment message comprises:

if the determination is that requested communication session is of a type that is designated for priority service, then using a first subroutine to select the one or more capsules in which to include the traffic channel assignment message; and if the determination is that the requested communication session is not of a type that is designated for priority service, then using a second subroutine to select the one or more capsules in which to include the traffic channel assignment message.

3. The method of claim 2, further comprising receiving a route update message from the access terminal, wherein the route update message identifies one or more sectors, and wherein the one or more selected capsules are selected from capsules that are transmitted in the one or more identified sectors.

4. The method of claim 3, wherein the first subroutine comprises, if the determination is that requested communication session is of a type that is designated for priority service, then selecting the synchronous and asynchronous capsules in each sector included in the route update message.

5. The method of claim 3, wherein selecting one or more capsules in which to include the traffic channel assignment message comprises:

determining a control channel occupancy level for at least a portion of the coverage area; and using the determined control channel occupancy level as a further basis for selecting the one or more capsules in which to include the traffic channel assignment message.

6. The method of claim 5, wherein using the determined control channel occupancy level as a further basis for selecting the one or more capsules in which to include the traffic channel assignment message comprises comparing the determined control channel occupancy level to one or more threshold control channel occupancy levels.

7. The method of claim 5, wherein the second subroutine comprises:

if the determined control channel occupancy level is greater than or equal to a first threshold, then selecting as the one or more capsules in which to include the traffic channel assignment message, the synchronous capsule of each sector identified in the route update message.

8. The method of claim 7, further comprising:

if the determined control channel occupancy level is less than the first threshold and greater than or equal to a second threshold, then:
(a) if the route update message identifies exactly one sector, selecting as the one or more capsules in which to include the traffic channel assignment message, the asynchronous capsule of a sector of access; and
(b) if the route update message identifies more than one sector, selecting as the one or more capsules in which to include the traffic channel assignment message, the asynchronous capsule of the sector of access and the synchronous capsule of any other sectors identified by the route update message.

9. The method of claim 8, further comprising:

if the determined control channel occupancy level is less than the second threshold and greater than or equal to a third threshold, then:
(a) if the route update message identifies exactly one sector, selecting as the one or more capsules in which to include the traffic channel assignment message the synchronous and asynchronous capsules of the sector of access; and
(b) if the route update message identifies more than one sector, selecting as the one or more capsules in which to include the traffic channel assignment message the synchronous and asynchronous capsules of the sector of access and the synchronous capsule of any other sectors identified by the route update message.

10. The method of claim 9, further comprising:

if the determined control channel occupancy level is less than the third threshold selecting as the one or more capsules in which to include the traffic channel assignment message the synchronous and asynchronous capsules of each sector identified in the route update message.

11. The method of claim 1, further comprising:

receiving a route update message from an access terminal, wherein the route update message identifies one or more sectors; and if the determination is that the requested communication session is not of a type that is designated for priority service, using a number of sectors identified in the route update message as a further basis for selecting the one or more capsules in which to include the traffic channel assignment message.

12. The method of claim 11, wherein the at least one sector identified in the route update message comprises a sector of access or one or more other sectors, or the sector of access and one or more other sectors, for which the access terminal has received a pilot signal.

13. The method of claim 1, wherein push-to-talk communication sessions are a type of communication session that is designated for priority service.

14. The method of claim 13, wherein the push-to-talk communication sessions comprise QChat communication sessions.

15. The method of claim 1, wherein best-effort communication sessions are a type of communication session that is not designated for priority service.

16. In a wireless communication network that provides wireless service in a coverage area, wherein the coverage area comprises a plurality of sectors, wherein a control channel is provided in each sector, and wherein the wireless communication network is configured to transmit synchronous capsules and asynchronous capsules in each control channel, a method for transmitting a traffic channel assignment message, the method comprising:

receiving a request from an access terminal to engage in a communication session;

determining a control channel occupancy level for at least a portion of the coverage area;

using the determined control channel occupancy level as a basis for selecting one or more capsules in which to include the traffic channel assignment message, wherein the traffic channel assignment message assigns a traffic channel to the access terminal for the communication session, and wherein selecting the one or more capsules comprises selecting from between: (a) one or more synchronous capsules, (b) one or more asynchronous capsules, and (c) one or more synchronous capsules and one or more asynchronous capsules; and transmitting each of the selected capsules, wherein each of the selected capsules comprises the traffic channel assignment message.

17. The method of claim 16, wherein using the determined control channel occupancy level as a basis for selecting one or more capsules in which to include the traffic channel assignment message comprises:

receiving a route update message from the access terminal;

if the determined control channel occupancy level is greater than a first threshold, selecting a synchronous capsule and an asynchronous capsule of each sector identified in the route update message;

if the determined control channel occupancy level is less than the first threshold and greater than a second threshold, wherein the second threshold is less than the first threshold, then:

(a) if the route update message identifies exactly one sector, selecting the asynchronous capsule of a sector of access; and (b) if the route update message identifies more than one sector, selecting the asynchronous capsule of the sector of access and the synchronous capsule of any other sectors identified by the route update;

if the determined control channel occupancy level is less than the second threshold and greater than a third threshold, wherein the third threshold is less than the second threshold, then:

(a) if the route update message identifies exactly one sector, selecting the synchronous and asynchronous capsules of the sector of access; and (b) if the route update message identifies more than one sector, selecting the synchronous and asynchronous capsules of the sector of access and the synchronous capsule of any other sectors identified by the route update message; and if the determined control channel occupancy level is less than the third threshold, then selecting the synchronous and asynchronous capsules of each sector identified in the route update message.

18. A system configured to select one or more capsules in which to include a traffic channel assignment message and to be implemented in a wireless communication network that provides wireless service in a coverage area, wherein the coverage area comprises a plurality of sectors, wherein a control channel is provided in each sector, and wherein the wireless communication network is configured to transmit synchronous capsules and asynchronous capsules in each control channel, the system comprising:

a receiver configured to receive a request from an access terminal to engage in a communication session;

a controller configured to:

make a determination as to whether or not the requested communication session is of a type that is designated for priority service;

use the determination of whether or not the requested communication session is of a type that is designated for priority service as a basis to select one or more capsules in which to include the traffic channel assignment message, wherein the traffic channel assignment message assigns a traffic channel to the access terminal for the communication session, wherein the one or more capsules are selected from between: (a) one or more synchronous capsules, (b) one or more asynchronous capsules, and (c) one or more synchronous capsules and one or more asynchronous capsules; and provide the traffic channel assignment message for inclusion in the selected capsules; and a transmitter configured to transmit the selected capsules, wherein each transmitted selected capsule includes the traffic channel assignment message.

19. The system of claim 18 further comprising data storage, wherein the data storage provides a database that identifies types of communication sessions that are designated for priority service.

20. The system of claim 19, wherein the controller is further configured to query the database to determine whether or not the requested communication session is of a type that is designated for priority service.

* * * * *